US012694303B2

(12) United States Patent     (10) Patent No.: US 12,694,303 B2
O'Donncha et al.     (45) Date of Patent: Jul. 28, 2026

(54) LEARNING SEMANTIC DESCRIPTION OF DATA BASED ON PHYSICAL KNOWLEDGE DATA

(71) Applicant: INTERNATIONAL BUSINESS MACHINES CORPORATION, Armonk, NY (US)

(72) Inventors: Fearghal O'Donncha, Aran Islands (IE); Amadou Ba, Navan (IE); William Karol Lynch, Rathkeale (IE); Theodore G Van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 17/650,625

(22) Filed: Feb. 10, 2022

(65) Prior Publication Data

US 2023/0252310 A1     Aug. 10, 2023

(51) Int. Cl.
    *G06N 5/02*     (2023.01)
    *G06N 5/022*     (2023.01)

(52) U.S. Cl.
    CPC .................................... *G06N 5/022* (2013.01)

(58) Field of Classification Search
    CPC .................................................... G06N 5/022
    See application file for complete search history.

(56) References Cited

U.S. PATENT DOCUMENTS

| | | | |
|---|---|---|---|
| 9,679,248 B2 | 6/2017 | Lecue et al. | |
| 10,552,537 B2 | 2/2020 | Jochim et al. | |
| 10,579,927 B2 | 3/2020 | Lecue et al. | |
| 10,614,196 B2 | 4/2020 | Maitra et al. | |
| 10,846,274 B2 * | 11/2020 | Hatami-Hanza | ........ G06F 16/22 |
| 2009/0119095 A1 * | 5/2009 | Beggelman | ............. G06F 40/30 |
| | | | 704/9 |
| 2018/0247209 A1 | 8/2018 | Lecue et al. | |
| 2018/0293511 A1 | 10/2018 | Bouillet et al. | |
| 2020/0401910 A1 * | 12/2020 | Hassanzadeh | ........ G06F 16/903 |
| 2021/0117853 A1 | 4/2021 | Lynch et al. | |

FOREIGN PATENT DOCUMENTS

| | | |
|---|---|---|
| CN | 110443127 A | 11/2019 |
| CN | 110888912 A | 3/2020 |
| CN | 109242014 A | 10/2021 |

(Continued)

OTHER PUBLICATIONS

Anila Butt, "DWRank: Learning concept ranking for ontology search" (Year: 2016).*

(Continued)

*Primary Examiner* — Van C Mang
(74) *Attorney, Agent, or Firm* — Elliot J. Shine

(57) ABSTRACT

Embodiments for learning semantic description of data based on physical knowledge in a computing environment by a processor. Physical knowledge data and semantic labels associated with data from one or more data sources may be learned. Source attributes of the one or more data sources may be associated with one or more classes and concepts of a plurality of ontologies based on the physical knowledge data and the semantic labels to generate textual descriptors of the data.

19 Claims, 7 Drawing Sheets

(56)                    References Cited

FOREIGN PATENT DOCUMENTS

WO          2021022571  A1     2/2021

OTHER PUBLICATIONS

Narayan, "Developing a novel force forecasting technique for early prediction of critical events in robotics" (Year: 2020).*

Ramuhalli, "Finite-Element Neural Networks for Solving Differential Equations" IEEE 2005 (Year: 2005).*

Brunton et al. "Discovering governing equations from data by sparse identification of nonlinear dynamical systems", PNAS, Apr. 12, 2016, pp. 3932-3937, vol. 113, No. 15, https://www.pnas.org/doi/10.1073/pnas.1517384113.

Chen et al. "ColNet: Embedding the Semantics of Web Tables for col. Type Prediction", taarXiv:1811.01304v2 [cs.CL], Nov. 14, 2018, 9 pages.

Gao et al. "Preliminary Exploration of Formula Embedding for Mathematical Information Retrieval: can mathematical formulae be embedded like a natural language?", arXiv:1707.05154v2 [cs.IR], Aug. 29, 2017,4 pages.

Mansouri et al. "Tangent-CFT: An Embedding Model for Mathematical Formulas", ACM SIGIR International Conference on the Theory of Information Retrieval (ICTIR '19), 2019, 8 pages.

Pfahler et al. "Semantic Search in Millions of Equations", KDD '20, Virtual Event, USA, Aug. 23-27, 2020, 9 pages.

Pham et al. "Semantic Labeling: A Domain-Independent Approach", University of Southern California, Los Angeles, USA, 2016, 17 pages.

* cited by examiner

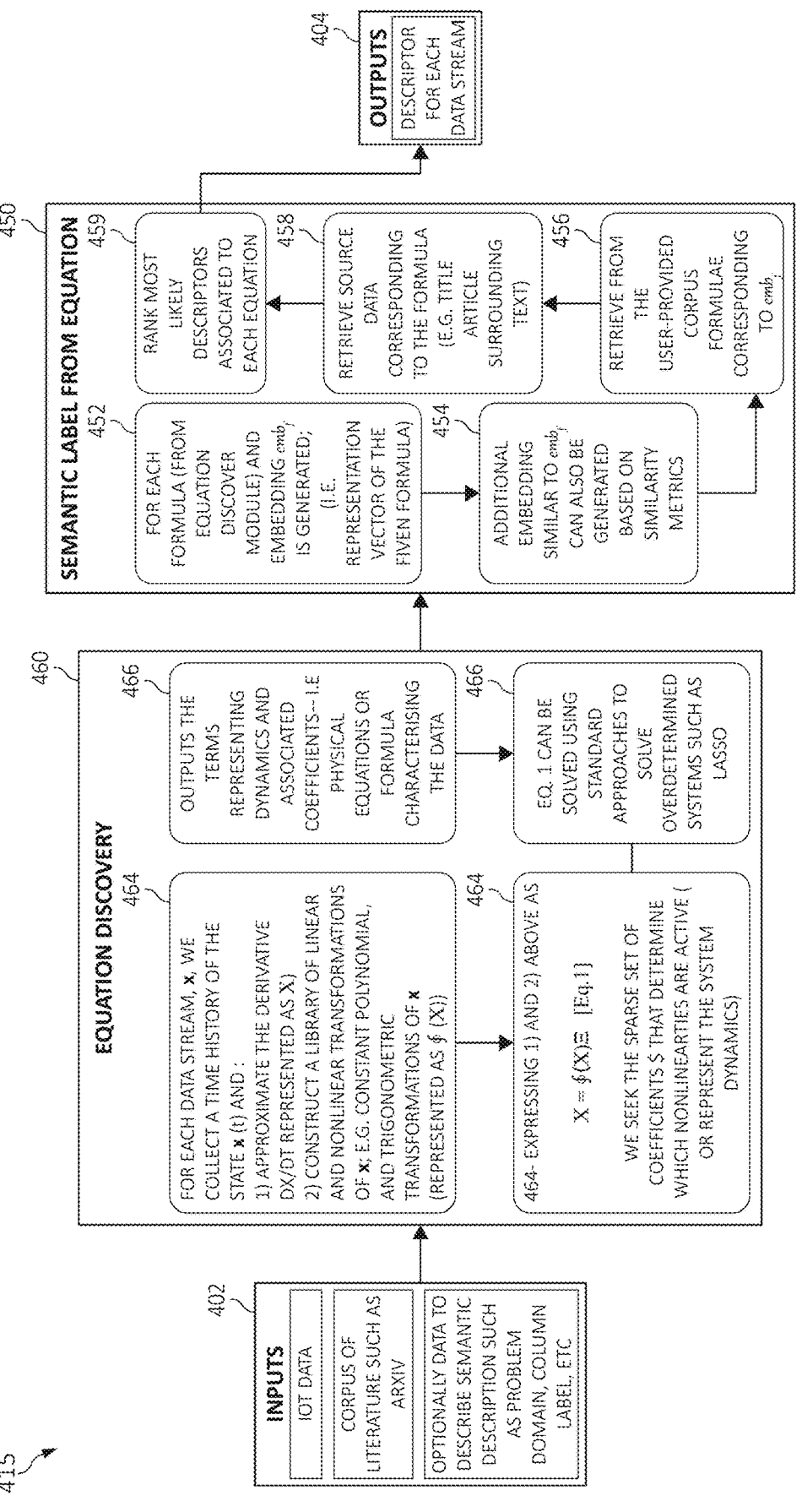

INPUTS 402

IOT DATA

CORPUS OF LITERATURE SUCH AS ARXIV

OPTIONALLY DATA TO DESCRIBE SEMANTIC DESCRIPTION SUCH AS PROBLEM DOMAIN, COLUMN LABEL, ETC

EQUATION DISCOVERY 460

464 — FOR EACH DATA STREAM, x, WE COLLECT A TIME HISTORY OF THE STATE x (t) AND :
1) APPROXIMATE THE DERIVATIVE DX/DT REPRESENTED AS Ẋ)
2) CONSTRUCT A LIBRARY OF LINEAR AND NONLINEAR TRANSFORMATIONS OF x; E.G. CONSTANT POLYNOMIAL, AND TRIGONOMETRIC TRANSFORMATIONS OF x (REPRESENTED AS $f$ (X))

464 — EXPRESSING 1) AND 2) ABOVE AS $$X = f(X) \Xi \quad [Eq.1]$$

WE SEEK THE SPARSE SET OF COEFFICIENTS S THAT DETERMINE WHICH NONLINEARTIES ARE ACTIVE ( OR REPRESENT THE SYSTEM DYNAMICS)

466 — OUTPUTS THE TERMS REPRESENTING DYNAMICS AND ASSOCIATED COEFFICIENTS—I.E PHYSICAL EQUATIONS OR FORMULA CHARACTERISING THE DATA

466 — EQ. 1 CAN BE SOLVED USING STANDARD APPROACHES TO SOLVE OVERDETERMINED SYSTEMS SUCH AS LASSO

SEMANTIC LABEL FROM EQUATION 450

452 — FOR EACH FORMULA (FROM EQUATION DISCOVER MODULE) AND EMBEDDING $emb_f$ IS GENERATED; (I.E. REPRESENTATION VECTOR OF THE FIVEN FORMULA)

454 — ADDITIONAL EMBEDDING SIMILAR TO $emb_f$ CAN ALSO BE GENERATED BASED ON SIMILARITY METRICS

459 — RANK MOST LIKELY DESCRIPTORS ASSOCIATED TO EACH EQUATION

458 — RETRIEVE SOURCE DATA CORRESPONDING TO THE FORMULA (E.G. TITLE ARTICLE SURROUNDING TEXT)

456 — RETRIEVE FROM THE USER-PROVIDED CORPUS FORMULAE CORRESPONDING TO $emb_j$

OUTPUTS 404

DESCRIPTOR FOR EACH DATA STREAM

600

START ~602

LEARN PHYSICAL KNOWLEDGE DATA AND SEMANTIC LABELS
ASSOCIATED WITH DATA FROM ONE OR MORE DATA SOURCES ~604

ASSOCIATE SOURCE ATTRIBUTES OF THE ONE OR MORE DATA
SOURCES WITH ONE OR MORE CLASSES AND CONCEPTS OF A
PLURALITY OF ONTOLOGIES BASED ON THE PHYSICAL KNOWLEDGE
DATA AND THE SEMANTIC LABELS ~606

END ~608

LEARNING SEMANTIC DESCRIPTION OF DATA BASED ON PHYSICAL KNOWLEDGE DATA

BACKGROUND OF THE INVENTION

Field of the Invention

The present invention relates in general to computing systems, and more particularly, to various embodiments for learning semantic description of data based on physical knowledge by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

According to an embodiment of the present invention, a method for learning semantic description of data based on physical knowledge in a computing environment, by one or more processors, is depicted. Physical knowledge data and semantic labels associated with data from one or more data sources may be learned. Source attributes of the one or more data sources may be associated with one or more classes and concepts of a plurality of ontologies based on the physical knowledge data and the semantic labels to generate textual descriptors of the data.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4A-4B are additional block diagrams depicting an exemplary functional relationships between various aspects of the present invention.

DETAILED DESCRIPTION OF THE DRAWINGS

Figure 1:
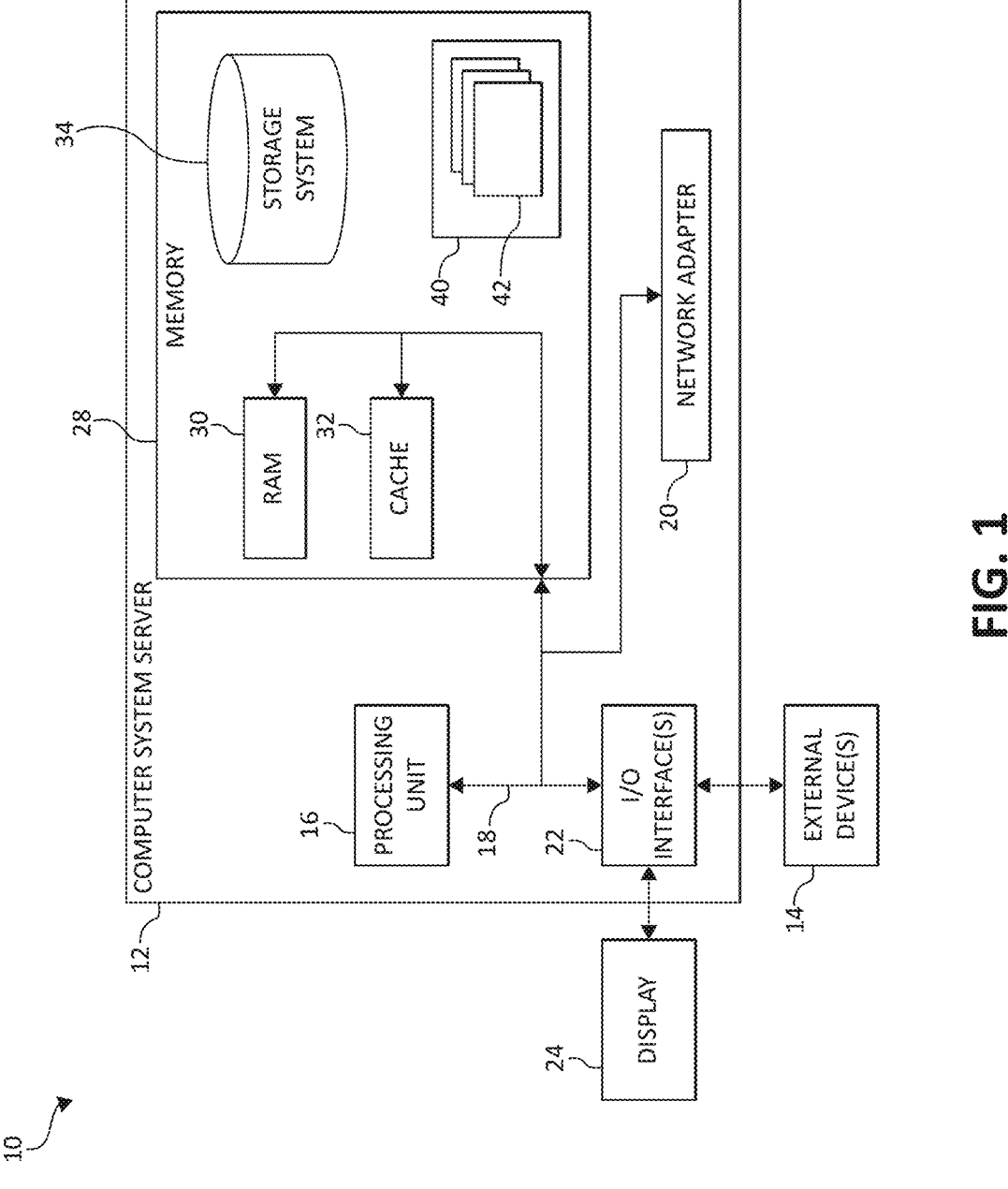
FIG. 1 is a block diagram depicting an exemplary cloud computing node according to an embodiment of the present invention.

Over the last decade, data analytics has become an important trend in many industries including e-commerce, healthcare, manufacture and more. The reasons behind the increasing interest are the availability of data, variety of open-source machine learning tools and powerful computing resources. Nevertheless, machine learning tools for analyzing data are still difficult to use and automate, since a typical data analytics project contains many tasks that have not been fully automated yet. For example, predictive data analytics project have attempted to provide automation tools yet there still remains a need to fully automate the various steps. Feature engineering, the cornerstone of successful predictive modeling, is one of the most important and time consuming tasks in predictive analytic operations because it prepares inputs to machine learning models by applying the most appropriate transformations to input data to best represent explanatory relationships. It thus plays an important role in deciding how machine learning models will perform. It is difficult to know a priori which features are most optimal and what transformations or combination of those features most closely represents system dynamics and response. In practice, feature engineering is guided by domain expertise, user knowledge and intuition, together with an iterative, trial-and-error approach. Feature engineering is a critical step in data science, which impacts the final prediction results. Feature engineering involves understanding domain knowledge and data exploration to discover the most relevant features from raw data, and combine or transform those features to be fed to the machine learning model.

Moreover, the process of labeling data is one of the biggest challenges faced by industry stakeholders and machine learning practitioners due to its cost intensiveness and workforce requirements, and requires deep domain knowledge. For example, managing the data streams coming from hundreds of sensors in an industrial setting within an automated data storage and management system is one such challenge. Ideally, acquiring meta descriptors to inform the system of the type and description of the data being collected and streamed would be extremely beneficial but such data is unavailable due to disparate sensors of different age, sophistication, and manufacturers. Further, a lack of standardization makes it difficult to automate the processing of data streams and the extraction of context from sensor data. Instead, what is required is the ability to generate meta descriptors based on the data itself. Furthermore, labeling big data emanating from physical processes quickly, efficiently, and accurately is a current challenge due to potential differences in data formats and characteristics, attribute names and values. These challenges are exacerbated by noisy and uncertain data. Thus, there is a need to learn semantic labeling to map attributes present in data to classes in an ontology and facilitate heterogeneous data integration emanating from physical systems.

Accordingly, the present invention provides for learning semantic description of data based on physical knowledge in a computing environment, by one or more processors, is depicted. Physical knowledge data and semantic labels associated with data from one or more data sources may be learned. Source attributes of the one or more data sources may be associated with one or more classes and concepts of a plurality of ontologies based on the physical knowledge data and the semantic labels to generate textual descriptors of the data.

In some implementations, the present invention provides for using learned information on the physical characteristics of a signal (e.g., a sensor signal or computing signal) to provide a semantic descriptors of the signal and to the sensor. In some implementations, the present invention provides for learning one or more physics (e.g., law of physics) encoded in a dataset and extracting semantic descriptors for the data based on the learned physics-based knowledge. Examples include the Navier-Stokes equations governing fluid flow or convection-diffusion-reaction equations governing transport in a fluid. That is, the physics (e.g., law of physics) encoded in a dataset may be used to analyze data provided as inputs to the database and outputs the semantic labelling associated to the data.

In some implementations, the present invention may analyze one-dimensional ("1D"), two-dimensional ("2D"), three-dimensional ("3D"), four-dimensional ("4D") spatio temporal signals input to the database and is able to operate for various applications and industries. Moreover, the present invention facilitates the exploitation of large scale, various and disparate datasets, which potentially is not labeled.

In some implementations, the present invention provides for learning physics and semantic labels from data from one or more data sources to guide machine learning model prediction and monitoring. New or additional features, which may be hidden to machine learning model, may be generated by transformations of the raw-data conducted as part of a "feature engineering" step. Semantic labels for the generated features may be derived based on the raw data, the learned physical descriptors, and the transformation applied to the data.

For example, the present invention may receive as input a dataset consisting of columns of numerical data. These columns of numerical data may be from some physical system/process equipped by a sensor network collecting data. Examples of the sensor network may include a network of sensors monitoring building systems, occupancy, and comfort levels, and/or a sensor network monitoring a set of ocean variables for industry operations such as, for aquaculture (e.g., monitoring temperature, dissolved oxygen, salinity, and chlorophyll). An equation/formula knowledge base that represent physical characteristics (e.g., heat transfer, advection diffusion process, conservation of momentum, fluid mechanics, etc.) may also be included as input data, which may, in some circumstances be automatically generated from a mathematical corpora. In some implementations, a combination of data may be used to guide semantic descriptors such as, for example, a problem topic, column label, column values, etc.

In some implementations, one or more variables or "source attributes" of a data source may be identified. The variables or "source attributes" may be a variable, attribute, characteristic, identifier (e.g., a sensor identifier ("ID")), column, or data related to a data source. For each of the variables or source attributes in a given dataset, a ranked list of the most likely/relatable concepts to be associated with that particular variable or source attribute may be generated and produced (e.g., a column corresponding to that variable).

Thus, the present invention provides for learning physical knowledge and training a machine learning with the physical knowledge to extract physical descriptors of the data. An automated semantic labelling pipeline provides for identifying textual descriptors for the raw data and based on the confidence metrics of the identified descriptors automatically providing semantic labels for the data.

In other implementations, a machine learning model may include a knowledge domain that may be used and may include an ontology of concepts representing a domain of knowledge. A thesaurus or ontology may be used as the domain knowledge and may also be used to associate various characteristics, attributes, symptoms, behaviors, sensitivities, parameters, user profiles, computing device profiles, group profiles, and/or relationships and/or responsibilities between one or more users and/or computing devices. In one aspect, the term "domain" is a term intended to have its ordinary meaning. In addition, the term "domain" may include an area of expertise for a system or a collection of materials, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

It should be noted as described herein, the term "intelligent" (or "cognition") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, judgment reasoning knowledge, and/or processes that may be determined and/or derived by machine learning.

In general, as used herein, "optimize" may refer to and/or defined as "maximize," "minimize," "most likely," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" or "most likely" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
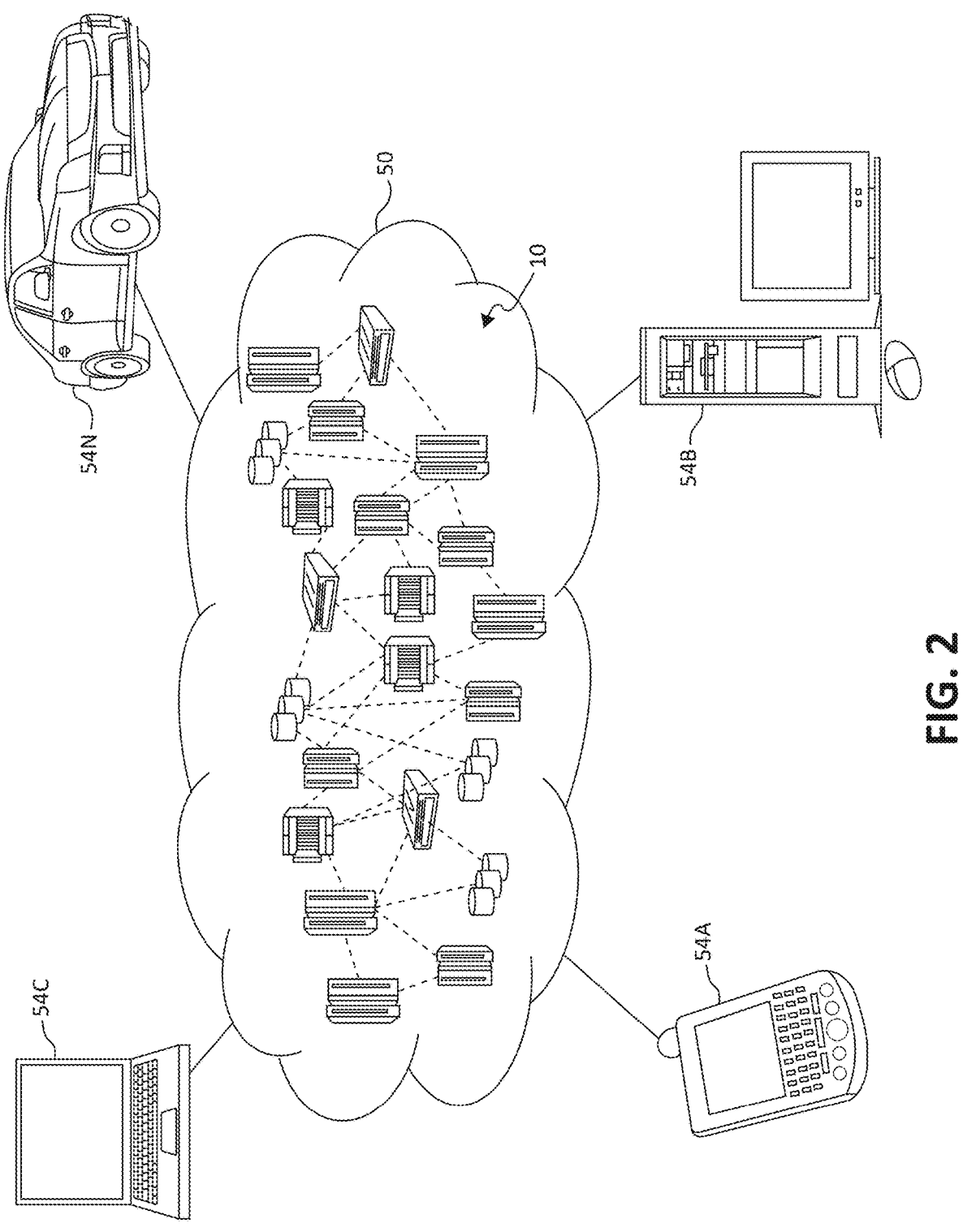
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
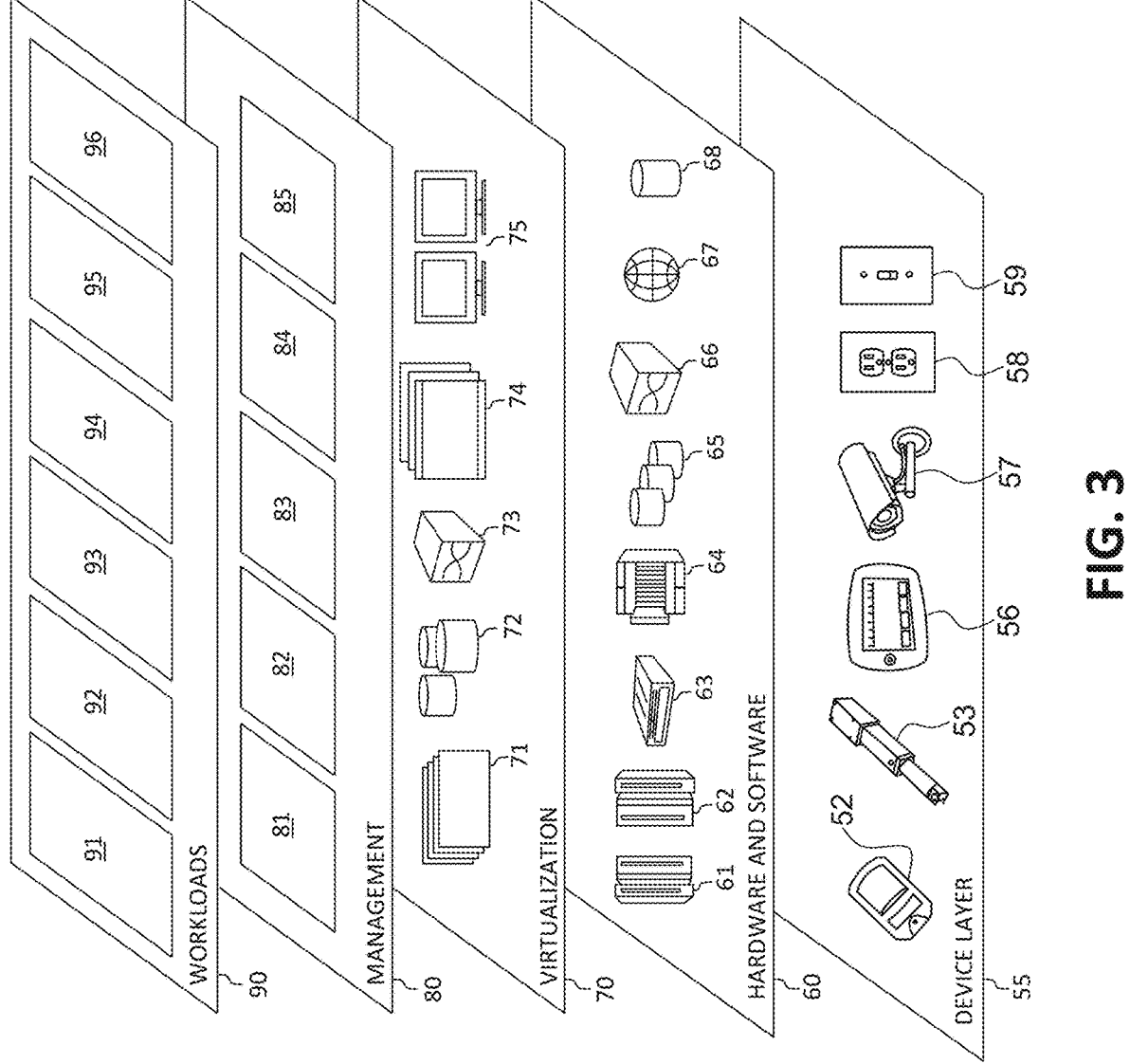
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for learning semantic description of data based on physical knowledge. In addition, workloads and functions 96 for learning semantic description of data based on physical knowledge may include such operations as data analytics, data analysis, and as will be further described, notification functionality. One of ordinary skill in the art will appreciate that the workloads and functions 96 for learning semantic description of data based on physical knowledge may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4A:
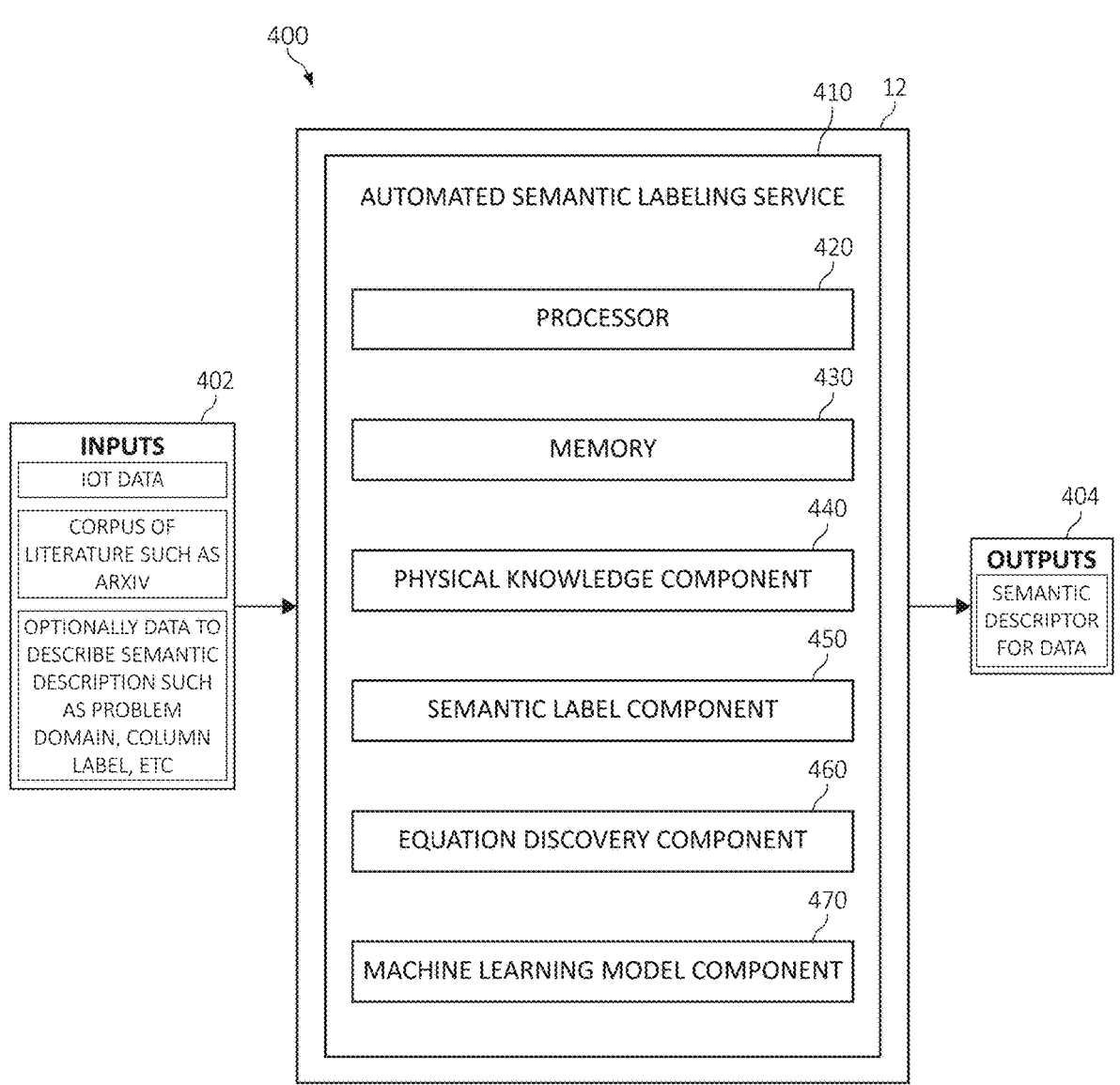

Turning now to FIGS. 4A-4B, are block diagrams depicting exemplary functional components 400 and 415 according to various mechanisms of the illustrated embodiments is shown. In one aspect, one or more of the components, modules, services, applications, and/or functions described in FIGS. 1-3 may be used in FIGS. 4A-4B. Repetitive description of like elements employed in other embodiments described herein is omitted for sake of brevity.

Turning now to FIG. 4A, an automated semantic labeling service 410 is shown, incorporating processing unit ("processor") 420 to perform various computational, data processing and other functionality in accordance with various aspects of the present invention. The automated semantic labeling service 410 may be provided by the computer system/server 12 of FIG. 1. The processing unit 420 may be in communication with memory 430. The automated semantic labeling service 410 may include a physical knowledge component 440, a semantic label component 450, an equation discovery model component 460, and a machine learning model component 470.

As one of ordinary skill in the art will appreciate, the depiction of the various functional units in automated semantic labeling service 410 is for purposes of illustration, as the functional units may be located within the automated semantic labeling service 410 or elsewhere within and/or between distributed computing components.

In general, by way of example only, the automated semantic labeling service 410 may receive data from one or more data sources 402. In one aspect, the data sources 402 may include IoT data, literature data (e.g., a corpus of literature such as, for example, arxiv), and/or data that describes semantic descriptors such as, for example, problem data, column data, etc.

For example, the input data from the data sources 402 may include columns of numerical data. The input data from the data sources 402 may also include equation/formula knowledge base that represent physical characteristics (e.g., heat transfer, advection diffusion process, conservation of momentum, fluid mechanics, etc.), and/or a combination of data used to guide semantic descriptors such as, for example, a problem topic, column label, column values, etc.

In some implementations, using the physical knowledge component 440, the semantic label component 450, the equation discovery model component 460, and the machine learning model component 470 may learn physical knowledge data and semantic labels associated with data from one or more data sources, and associate source attributes of the one or more data sources with one or more classes and concepts of a plurality of ontologies based on the physical knowledge data and the semantic labels. In some implementations, using the physical knowledge component 440, the semantic label component 450, the equation discovery model component 460, and the machine learning model component 470 may learn physical knowledge data associated with a dataset from the one or more data sources 402; and transform the physical knowledge data into a semantic labels, which may be output 404 (e.g., semantic descriptors for the data such as, the data from data sources 402).

In some implementations, using the physical knowledge component 440, the semantic label component 450, the equation discovery model component 460, and the machine learning model component 470 may identify one or more physical equation models having a degree of relevancy related to the data, and identify the semantic labels from one or more physical equation models having a degree of relevancy to the data.

In other implementations, using the physical knowledge component 440, the semantic label component 450, the equation discovery model component 460, and the machine learning model component 470 may receive multidimensional data, which is time dependent, from the data sources 402, apply a machine learning operation to identify one or more function labels that describe the dataset; and identify one or more physical equation models based on the one or more function labels.

In some implementations, using the physical knowledge component 440, the semantic label component 450, the equation discovery model component 460, and the machine learning model component 470 may generate and categorize the physical knowledge data and the semantic labels and into the one or more classes and concepts of a plurality of ontologies.

In some implementations, using the physical knowledge component 440, the semantic label component 450, the equation discovery model component 460, and the machine learning model component 470 may rank each of the one or more classes and concepts of the plurality of ontologies according to a degree of similarities between the source attributes of the one or more data sources and the data based on the physical knowledge data and the semantic labels.

The machine learning model component 470 may be initialized and activated to translate time series data into one or more physical equation models representing and describing behavior of the physical knowledge data and the semantic labels, wherein the physical knowledge data includes one or more rules, policies, and laws pertaining to physics, and the one or more physical equation models and semantic labels are used by one or more automated feature engineering models; and execute one or more prediction and interpolations operations based on the dataset.

The physical knowledge component 440 may receive a dataset and extract various data such as for example, physical knowledge data. The physical knowledge component 440, in association with the equation discovery component 440, may translate time series or geospatial data into one or more equations representing and describing behavior of the physical knowledge data, where the physical knowledge data includes one or more rules, policies, and laws pertaining to physics, and the one or more equations are used by the one or more automated feature engineering models. An example may include, but not limited to, identifying that data coming from an air quality or nitric oxide ("NOx") sensor in a city may be represented by and advection-diffusion equation or relationship. With this relationship identified, the model may classify the data as being an "air quality sensor" measuring "NOx".

More specifically, the physical knowledge component 440, in association with the equation discovery component 440, may generate and categorize the physical descriptors and basis functions that describe the input datasets. For example, the physical knowledge component 440, in association with the equation discovery component 440, may receive data from one or more sensors in a sensor network monitoring a set of ocean variables for industry operations such as, for aquaculture (e.g., monitoring temperature, dissolved oxygen, salinity, and chlorophyll). An equation/formula knowledge base that represent physical characteristics (e.g., heat transfer, advection diffusion process, conservation of momentum, fluid mechanics, etc.) may also be included as input data, which may, in some circumstances be automatically generated from a mathematical corpora. In some implementations, a combination of data may be used to guide semantic descriptors such as, for example, a problem topic, column label, column values, etc. These semantic descriptors can be used as labels to the internet of things ("IoT") data coming from the different sensors. The labelled data can then be integrated as part of intelligent management systems such as Digital Twin for environmental monitoring and can be automatically ingested by modelling frameworks.

Thus, the physical knowledge component 440, in association with the equation discovery component 440, may infer the physical equations characterizing these variables or "source attributes" based on raw data (e.g., a knowledge domain or ontology relating to physical data such as, for example, knowledge relating to the topic of physics). Each sensor signal is processed through the physical knowledge component 440 and the equation discovery component 440 may detect, learn, generate, and/or identity one or more associated equation (or equations) and/or basis function (or multiple basis functions) that characterize the data processed from the signal by the physical knowledge component 440.

In some implementations, the equation discovery component 440 may represent one or more physical laws and apply data and computing a loss function. For example, for representing physics laws, applying data and computing loss functions may including the following. A physics laws can be expressed in terms of temporal and spatial derivatives. As an example, advection diffusion equation may be described by a simple formula like the advection diffusion equation:

$$l_t + \nabla*Cu = \nabla*(K*\nabla C) + S_1 \tag{1},$$

where S is a source magnitude, C is a concentration of a pollutant and K is the diffusivity? These equations may be arranged in the form:

$$X_k = f_k(X) \tag{2}.$$

The terms of this type of equation can be directly computed from the data using finite difference methods and the local coefficients solved using matrix methods. Once all the terms in the equations are known, the physics equations can then be applied in the loss function of a neural net training algorithm.

In other implementations, for representing physics laws, applying data and computing loss functions may including the following.

One or more various types of methods may be used by further arranging the equations:

$$X = \Theta(X)\Xi \tag{3},$$

where $\Xi$ is a matrix coefficient, and $\Theta(X)$ refers to the component functions of the formula a matrix of coefficients? The equation can be further reduced to:

$$X_k = f_k(X) = \Theta(X^T)\xi_k \tag{4},$$

where $\xi_k$ is a vector of coefficients in $\Xi$. These matrix equations can be solved directly by matrix methods. Their effectiveness in replicating the data can be tested directly on the data. A this point they can be accepted or rejected as valid.

In some implementations, the equation discovery component 440, for representing physics laws, the above steps for a single physics equation or group of equations may be performed as follows. In step 1), a physics equation may be selected. In step 2), the physics equation may be separated into individual functions and arranged as matrices for computation. In step 3), each component function may be numerically evaluated for some or all data. In step 4), an operation may be performed to solve for coefficients corresponding to each function. In step 5), each equation may be validated against data (e.g., compute mean square error or other metric). In step 6), each equation may be accepted or rejected. In step 7), if the equation is accepted, the equation may be applied to a loss function for training deep neural net on data. A library of known physics can thus be constructed containing the set of functions and the means of their computation for each physics system that is to be considered.

For further explanation, the semantic label component 450 may label the data based on the equations using the following operations. In step 1), based on each formula extracted from the physical knowledge component 440 and the equation discovery component 440, a formula embedding $emb_f$ is generated to enable semantic matching. In some implementations, one or more various operations may be used for generating formula embeddings $emb_f$ (e.g., graph convolutional networks or fastText n-gram embedding model).

In step 2), the semantic label component 450 identifies the formula embeddings most similar to the generated embedding, $emb_f$ identified in Step 1. A similarity measure (e.g., cosine distance) may be used to identify the k similar embeddings $emb_k$. It should be noted that this also allows the retrieval of similar, but perhaps not identical formulas, which can be used to extract confidence metrics on matchings. Hence a number of ranked embeddings $emb_k$ (ranked based on confidence metrics) may be returned that are identified as being similar to the embedding for the formula extracted from data $emb_f$ In step 3), for each formula embedding $emb_k$ from step 2, step 3a) retrieve the formula corresponding to embedding emb_k, based on an inverse of step 1, which may be termed formula, $f_k$. This returns a ranked number of formulas $f_k$, with confidence metrics potentially associated to the similarity measure identifying whether the given embeddings, $emb_f$, are similar to the extracted embedding $emb_k$. Step 3b) retrieves source data associated with formula $f_k$, that identifies textual descriptors for the extracted formula. These descriptors can include, for example, a source article title, keywords, topic, surrounding text, etc, which may be performed using a variety of machine learning approaches. One approach may use unsupervised representation learning task that combines embedding learning with self-supervised learning. This can use graph convolutional neural networks to embed mathematical expression into low-dimensional vector spaces that allow efficient nearest neighbor queries. Finally, step 3c) map variables in function $f_k$ to concepts (either directly or via textual descriptions). The concepts can represent the different variables that are represented in the function. In some implementations, various mapping operations maybe used for mapping variables/symbols concepts may be used (e.g., heuristic based approaches, supervised machine learning, transfer learning etc.).

In step 4, one or more of the most similar parameters associated with each variable or source attribute may be ranked by the following input data. That is, the input for ranking may be: a) the concepts and confidence score generated in step 3, and the frequency with which concepts are associated with variables in step 3, and b), the similarity measure generated in step 2.

Also, in the event that the input data is a combination of the following: a) a problem topic, column label, column values, etc. then these additional contextual information can be used to update the final ranking by for example using some combination of the following: a) executing a filtering operation (e.g., topic filtering), b) using a similarity measure with the column label, and/or c) using a suitability of column values to a candidate concept assignment.

To further illustrate, consider the following example relating to monitoring ocean data. For example, monitoring ocean processes may rely on deploying sensors and communicating (e.g., streaming) data from the sensors to local on-site computer or cloud computing environment. However, similar to IoT applications, an exhaustively defined ontology is unavailable for label descriptors (e.g., sensor descriptors or source attributes) particularly since there is a large variety of senor providers. Often data is returned with some unique identifier ("ID") that relates to the sensor rather than what is being measured and often sensors sample multiple different variables for cost economy.

However, by deploying the illustrative embodiments described herein such as, for example, for monitoring temperature in the ocean, the automated semantic labeling service 410 (e.g., the equation discovery model component 460) may return data/information representing 1) gradient information such as, for example, gradients in space and time together with associated coefficients and 2) harmonic or sinusoidal functions representing seasonal or variations in temperature.

The generated equation in terms of $$\alpha\frac{\partial}{\partial t} + \beta\frac{\partial}{\partial x} + \epsilon,$$

together with the associated coefficient value (indicating the spatial and temporal mixing profiles) and together with the trigonometric functions denoting an annual cycle, provides information indicative of a temperature sensor. Together with information on the sensor domain (e.g. literature corpus provided or information that sensor is deployed in the ocean), semantic labelling may be performed from the equation discovery model component 460 to return semantic descriptors of the data as a sensor (e.g., an ocean_temperature_sensor).

Also, it should be noted, by way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

For further explanation, FIG. 4B depicts further explanation of use of the semantic label component 450 and the equation discovery model component 460. As depicted, the equation discovery model component 460 may receive input data (e.g., raw input data) from data sources 402 and using one or more basic functions, generate one or more equations such as, for example, determining and generating one or more equations (e.g., partial differential equation ("PDE") or PDEs (if any) that capture the patterns in the data.

As depicted in block 462, the equation discovery model component 460 may, for each x data stream, approximate a time history of the state x(t) is collected and 1) a derivative (dx/dt) represented as $\dot{X}$, and 2) a library of linear and non-linear transformations of x may be constructed such as, for example, a constant, polynomial, and trigonomic transformations of x represented as $\Phi\dot{X}$, which may be expressed as equation 4:

$$\dot{X} = \Phi(X)\Xi \qquad (4),$$

In block 464, the equation discovery model component 460 may identify (e.g., seek/find) a sparse sent of coefficients $\Xi$ that determine which non-linearities are active (or at least represent dynamics of a system). Because $\Xi$ is sparse there are only a few of these nonlinearities are active in each row. Hence, we may set up a sparse regression problem to determine the sparse vectors of coefficients $\Xi=[\xi_1, \xi_2, \ldots, \xi_n]$ that determine which nonlinearities are active.

In block 466, the equation discovery model component 460 may use standard approaches to solve equation 4. The least absolute shrinkage and selection operator ("LASSO") is an l1-regularized regression that promotes sparsity and works well with this type of data. However, it may be computationally expensive for very large data sets. An alternative approach can use sequential thresholded least-squares method that provides more computational efficiency.

In block 468, the equation discovery model component 460 may generate (e.g., output) terms/semantic terms representing dynamics and associated coefficients (i.e., physical equations or formula characterizing the input data from data sources 402).

Moving now to block 452, the semantic label component 450 may, for each formula (e.g., formula's from the equation discovery model component 460), generate a formula embedding $emb_f$ (i.e., a representation vector of a formula).

In block 454, the semantic label component 450 may generate additional embedding emb_k based on similarity metrics (e.g., cosine distance).

In block 456, the semantic label component 450 may retrieve from a formula from a database, knowledge domain, and/or a user-provided corpus corresponding to the formula embedding $emb_f$.

In block 458, the semantic label component 450 may retrieve source data (e.g., source data from one or more of the data sources 402) corresponding to the formula/equation (e.g., the source data being a title, articles, surrounding text, etc.).

In block 459, the semantic label component 450 may rank each of the likely or most similar or "optimized" semantic descriptors associated with each of the formulas/equations. The ranking can be informed by the confidence metrics associated to the similarity measure identifying whether the given embeddings, $emb_f$, are similar to the extracted embedding $emb_k$. In turn, the semantic label component 450 generates the output 404, which may be a semantic descriptor (e.g., semantic label) for each x data stream.

Figure 5:
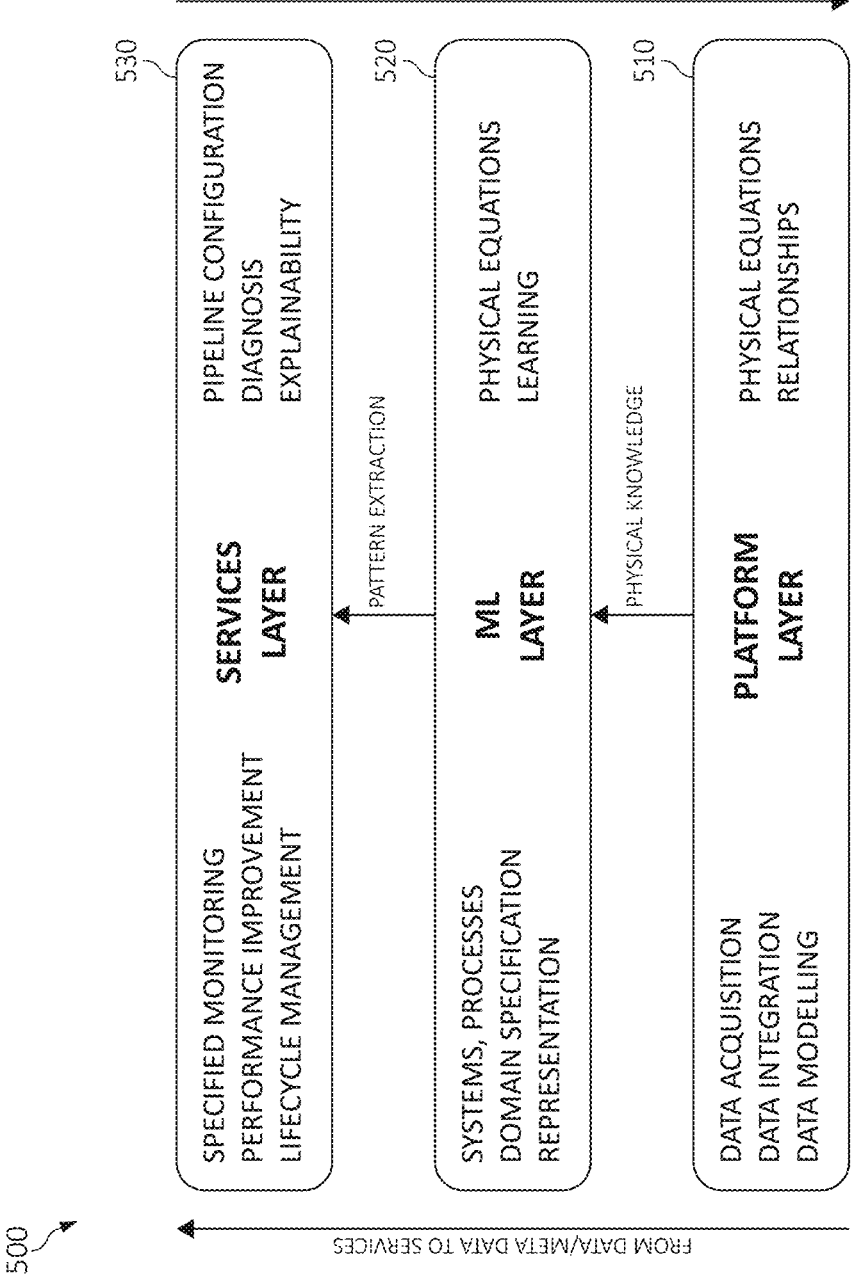
FIG. 5 is an additional block diagram depicting using physical knowledge to learn physical equation models and semantic description of data in a computing environment according to an embodiment of the present invention.

For further explanation, FIG. 5 is a block diagram 500 depicting use of learned semantic description of data based on physical knowledge to generate textual descriptors of the data in a computing environment. In one aspect, one or more of the components, modules, services, applications, and/or functions described in FIGS. 1-4A-4B may be used in FIG. 5. Repetitive description of like elements employed in other embodiments described herein is omitted for sake of brevity.

As depicted, a platform layer 510, a machine learning layer 520, and a services layer 530 may be provided for using learned physical knowledge to guide feature engineering in a computing environment.

The platform layer 510 includes processing and providing data acquisition, data integration, and data modeling. The platform layer 510 also includes maintaining and providing the physics knowledge database having the physics knowledge such as, for example, physical or physics equations and relationships. The platform layer 510 ingests data from a database or an external sensor and processes the data towards a form amenable to machine learning. Basic data cleansing frameworks may be implemented such as outlier removal or data imputation. If meta descriptors of the data exist, these can be provided to a semantic modelling layer that extracts data context to further guide model development. Information on context can be used to guide the selection of appropriate physical equations for the data based on given descriptors (e.g., if the meta descriptors refer to atmospheric datasets, it can be indicative to select from the family of Navier Stokes and advection-diffusion equations). A database of possible physics equations and basis functions are also provisioned and maintained in this platform layer 510. The equations and functions can be stored in a database, provided by the user, or extracted from an external mathematical database or scientific corpora using API connectors or natural language processing from pertinent sources (e.g., an external database/library or a scientific repository).

The physical knowledge learning and processing occurs between the platform layer 510 and the machine learning layer 520. That is, the machine learning layer 520 may use and access the physical knowledge for learning the physics equations, which may be previously hidden to a machine learning model.

The machine learning layer 520 includes knowledge of and access to each of the computing systems, processes, domain specifications and representations. The machine learning layer 520 also includes learning the physics knowledge such as, for example, physical or physics equations and relationships. That is, the machine learning layer 520 may acting upon and relating the extracted physics equations to the input data (e.g., apply physics equations to time series data). The machine learning layer 520 processes the data to 1) identify a set of possible semantic labels or feature transformations or combinations that could be applied to the data based on data-driven discovery of physical relationships, 2) transform the raw dataset based on the identified equations and basis functions, and 3) train and validate the machine learning model on the transformed semantic labels or feature transformations. The machine learning layer 520 selects the optimal combination of semantic labels or feature transformations and model configuration.

The pattern extractions occurs between the machine learning layer 520 and the services layer 530. That is, the most relevant physical equations are extracted based on the data. That is, the physical equations or difference equations are extracted and prioritized by the machine learning layer 520 based on a match between one or more physical equations and a given data set.

The services layer 530 may provide specified monitoring of the machine learning models, performance improvement, and lifecycle management of the machine learning models. The services layer 530 may also allow the user to interface with the trained model through configuration, interpretability, and explainability. The services layer 530 may also provide for detecting the inconsistencies in the machine learning models. The services layer 530 may evaluate the machine learning models with the given inputs or data and identify machine learning model inconsistency and for identifying improved or decreased machine learning model performance based on the given similarity measures and confidence metrics for the semantic labelling. Aspects related to model monitoring, management, and interpretation are provisioned within this services layer 530.

Figure 6:
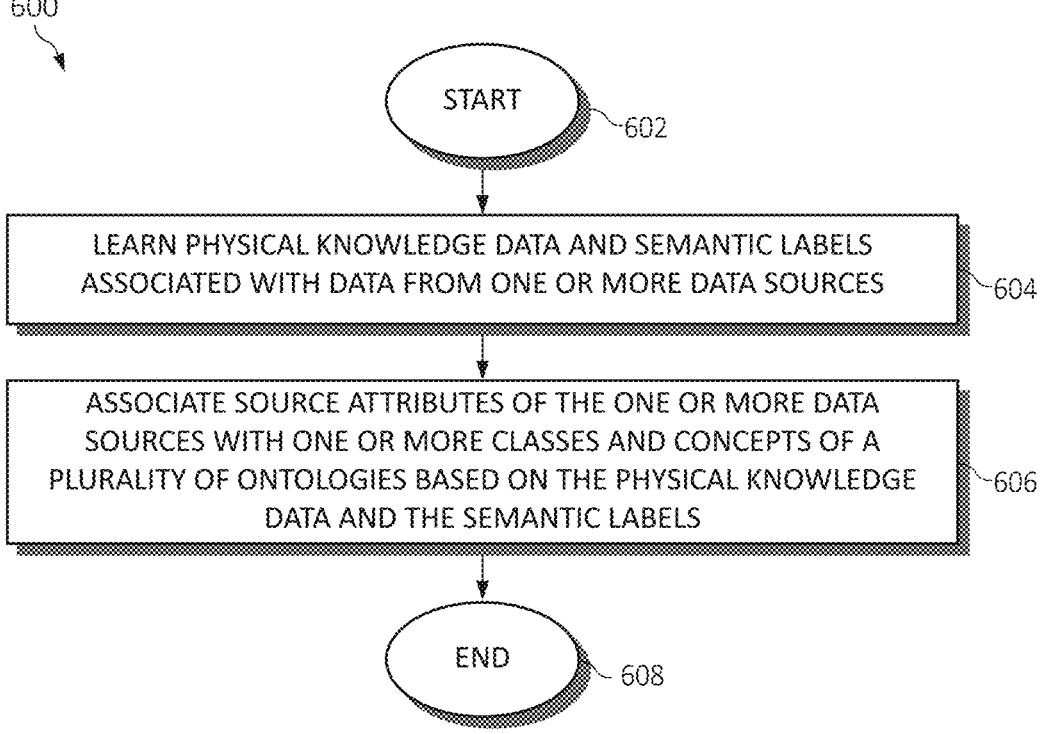
FIG. 6 is a flowchart diagram depicting an additional exemplary method for using learned physical knowledge to guide feature engineering in a computing environment according to an embodiment of the present invention.

FIG. 6 is a flowchart diagram depicting an exemplary method for learning semantic description of data based on physical knowledge in a computing environment. In one aspect, each of the devices, components, modules, operations, and/or functions described in FIGS. 1-6 also may apply or perform one or more operations or actions of FIG. 6. The functionality 600 may be implemented as a method executed as instructions on a machine, where the instructions are included on at least one computer readable medium or one non-transitory machine-readable storage medium. The functionality 600 may start in block 602.

Physical knowledge data and semantic labels associated with data from one or more data sources may be learned, as in block 604. Source attributes of the one or more data sources may be associated with one or more classes and concepts of a plurality of ontologies based on the physical knowledge data and the semantic labels to generate textual descriptors of the data, as in block 606. In one aspect, the functionality 600 may end, as in block 608.

In one aspect, in conjunction with and/or as part of at least one block of FIG. 6, the operations of method 600 may include each of the following. The operations of method 600 may translate time series data into one or more equations representing and describing behavior of the physical knowledge data, where the physical knowledge data includes one or more rules, policies, and laws pertaining to physics, and the one or more equations are used by the one or more automated feature engineering models.

The operations of method 600 may represent the physical knowledge data as temporal and spectral features using one or more feature vectors. The operations of method 600 may identify one or more patterns that match one or more equations describing behavior of the physical knowledge data and the dataset.

The operations of method 600 may identify one or more physical equation models having a degree of relevancy related to the data and identify the semantic labels from one or more physical equation models having a degree of relevancy to the data.

The operations of method 600 may receive multidimensional data that is time dependent; apply a machine learning operation to identify one or more function labels that describe the dataset; and identify one or more physical equation models based on the one or more function labels.

The operations of method 600 may generate and categorize the physical knowledge data and the semantic labels and into the one or more classes and concepts of a plurality of ontologies.

The operations of method 600 may rank each of the one or more classes and concepts of the plurality of ontologies according to a degree of similarities between the source attributes of the one or more data sources and the data based on the physical knowledge data and the semantic labels.

The operations of method 600 may initialize a machine learning model to translate time series data into one or more physical equation models representing and describing behavior of the physical knowledge data and the semantic labels, wherein the physical knowledge data includes one or more rules, policies, and laws pertaining to physics, and the one or more physical equation models and semantic labels are used by one or more automated feature engineering models; and execute one or more prediction and interpolations operations based on the dataset.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for learning semantic description of data based on physical knowledge in a computing environment, comprising:

learning, by a processor, physical knowledge data and semantic labels associated with data from one or more data sources, wherein the processor is one of a plurality of components, wherein the plurality of components further include a physical knowledge component, a semantic label component, an equation discovery component, and a machine learning model component;

associating, by the processor, source attributes of the one or more data sources with one or more classes and concepts of a plurality of ontologies based on the physical knowledge data and the semantic labels to generate textual descriptors of the data;

ranking, by the processor, each of the one or more classes and concepts of the plurality of ontologies according to a degree of similarities between the source attributes of the one or more data sources and the data based on the physical knowledge data and the semantic labels; and generating, using a plurality of layers, a semantic descriptor for each of the one or more data sources, wherein the plurality of layers include at least a platform layer, a machine learning layer, and a services layer, wherein the platform layer processes the data for the machine learning layer using one or more data cleansing frameworks, wherein pattern extractions occur between the machine learning layer and the services layer where the machine learning layer prioritizes one or more physical equations based on a match between the one or more physical equations and the data, and wherein the services layer enables a user to interface with a trained model.

2. The method of claim 1, further comprising:

identifying, by an equation discovery model, one or more physical equation models having a degree of relevancy related to the data; and identifying, by the equation discovery model, the semantic labels from one or more physical equation models having a degree of relevancy to the data.

3. The method of claim 1, further comprising:

receiving multidimensional data that is time dependent;

applying a machine learning operation that combines embedding learning with self-supervised learning to identify one or more function labels that describe the dataset; and identifying one or more physical equation models based on the one or more function labels by mapping variables in a function to concepts using a graph convolutional neural network to embed a mathematical expression into low-dimensional vector spaces.

4. The method of claim 1, further including initializing a machine learning model to:

translate time series data into one or more physical equation models representing and describing behavior of the physical knowledge data and the semantic labels, wherein the physical knowledge data includes one or more rules, policies, and laws pertaining to physics, and the one or more physical equation models and semantic labels are used by one or more automated feature engineering models; and execute one or more prediction and interpolations operations based on the dataset.

5. A system for learning semantic description of data based on physical knowledge in a computing environment, comprising:

one or more computers with executable instructions that when executed cause the system to:

learn physical knowledge data and semantic labels associated with data from one or more data sources, wherein the processor is one of a plurality of components, wherein the plurality of components further include a physical knowledge component, a semantic label component, an equation discovery component, and a machine learning model component;

associate source attributes of the one or more data sources with one or more classes and concepts of a plurality of ontologies based on the physical knowledge data and the semantic labels;

rank each of the one or more classes and concepts of the plurality of ontologies according to a degree of similarities between the source attributes of the one or more data sources and the data based on the physical knowledge data and the semantic labels; and generate, using a plurality of layers a semantic descriptor for each of the one or more data sources, wherein the plurality of layers include at least a platform layer, a machine learning layer, and a services layer, wherein the platform layer processes the data for the machine learning layer using one or more data cleansing frameworks, wherein pattern extractions occur between the machine learning layer and the services layer where the machine learning layer prioritizes one or more physical equations based on a match between the one or more physical equations and the data, and wherein the services layer enables a user to interface with a trained model.

6. The system of claim 5, wherein the executable instructions that when executed cause the system to:

identify, by an equation discovery model, one or more physical equation models having a degree of relevancy related to the data; and identify, by the equation discovery model, the semantic labels from one or more physical equation models having a degree of relevancy to the data.

7. The system of claim 5, wherein the executable instructions that when executed cause the system to:

receive multidimensional data that is time dependent;

apply a machine learning operation that combines embedding learning with self-supervised learning to identify one or more function labels that describe the dataset; and identify one or more physical equation models based on the one or more function labels by mapping variables in a function to concepts using a graph convolutional neural network to embed a mathematical expression into low-dimensional vector spaces.

8. The system of claim 5, wherein the executable instructions that when executed cause the system to initialize a machine learning model to:

translate time series data into one or more physical equation models representing and describing behavior of the physical knowledge data and the semantic labels, wherein the physical knowledge data includes one or more rules, policies, and laws pertaining to physics, and the one or more physical equation models and semantic labels are used by one or more automated feature engineering models; and execute one or more prediction and interpolations operations based on the dataset.

9. A computer program product for learning semantic description of data based on physical knowledge in a computing environment, the computer program product comprising:

one or more computer readable storage media, and program instructions collectively stored on the one or more computer readable storage media, the program instruction comprising:

program instructions to learn physical knowledge data and semantic labels associated with data from one or more data sources, wherein the processor is one of a plurality of components, wherein the plurality of components further include a physical knowledge component, a semantic label component, an equation discovery component, and a machine learning model component;

program instructions to associate source attributes of the one or more data sources with one or more classes and concepts of a plurality of ontologies based on the physical knowledge data and the semantic labels;

program instructions to rank each of the one or more classes and concepts of the plurality of ontologies according to a degree of similarities between the source attributes of the one or more data sources and the data based on the physical knowledge data and the semantic labels; and program instructions to generate, using a plurality of layers, a semantic descriptor for each of the one or more data sources, wherein the plurality of layers include at least a platform layer, a machine learning layer, and a services layer, wherein the platform layer processes the data for the machine learning layer using one or more data cleansing frameworks, wherein pattern extractions occur between the machine learning layer and the services layer where the machine learning layer prioritizes one or more physical equations based on a match between the one or more physical equations and the data, and wherein the services layer enables a user to interface with a trained model.

10. The computer program product of claim 9, further including program instructions to:

identify, by an equation discovery model, one or more physical equation models having a degree of relevancy related to the data; and identify, by the equation discovery model, the semantic labels from the one or more physical equation models having a degree of relevancy to the data.

11. The computer program product of claim 9, further including program instructions to:

receive multidimensional data that is time dependent;

apply a machine learning operation that combines embedding learning with self-supervised learning to identify one or more function labels that describe the dataset; and identify one or more physical equation models based on the one or more function labels by mapping variables in a function to concepts using a graph convolutional neural network to embed a mathematical expression into low-dimensional vector spaces.

12. The computer program product of claim 9, further including program instructions to initialize a machine learning model to:

translate time series data into one or more physical equation models representing and describing behavior of the physical knowledge data and the semantic labels, wherein the physical knowledge data includes one or more rules, policies, and laws pertaining to physics, and the one or more physical equation models and semantic labels are used by one or more automated feature engineering models; and execute one or more prediction and interpolations operations based on the dataset.

13. The method of claim 2, further comprising:

generating, by the semantic label component, formula embeddings for each of the one or more physical equation models;

identifying, by the semantic label component, similar embeddings based on a similarity measure;

ranking, by the semantic label component, the similar embeddings based on one or more confidence metrics;

retrieving, by the semantic label component, a plurality of ranked formulas; and retrieving, by the semantic label component, source data associated with each of the plurality of ranked formulas, wherein the source data identifies textual descriptors for each of the plurality of ranked formulas.

14. The method of claim 1, wherein a machine learning model of the machine learning component may be trained based on the physical knowledge data and the semantic labels associated with the data from the one or more data sources and performs the associating of the source attributed of the one or more data sources with the one or more classes and concepts of the plurality of ontologies.

15. The method of claim 1, further comprising:

processing, by the physical knowledge component, each sensor signal received from one or more Internet of Things (IoT) devices;

identifying, by the equation discovery component, one or more equations associated with the sensor signal processed by the physical knowledge component, wherein the terms of the one or more equations are directly computed from sensor signal data using finite difference methods and local coefficients; and applying the one or more equations in a loss function of a neural net training algorithm.

16. The method of claim 1, wherein the plurality of layers use the physical knowledge data learned to guide feature engineering in the computing environment.

17. The method of claim 1, wherein the services layer provides specified monitoring of one or more machine learning models, including performance improvement of the one or more machine learning models and lifecycle management.

18. The system of claim 5, wherein the plurality of layers use the physical knowledge data learned to guide feature engineering in the computing environment, and wherein the services layer provides specified monitoring of one or more machine learning models, including performance improvement of the one or more machine learning models and lifecycle management.

19. The computer program product of claim 9, wherein the plurality of layers use the physical knowledge data learned to guide feature engineering in the computing environment, and wherein the services layer provides specified monitoring of one or more machine learning models, including performance improvement of the one or more machine learning models and lifecycle management.

\* \* \* \* \*